United States Patent
Botros

(10) Patent No.: US 6,835,777 B2
(45) Date of Patent: Dec. 28, 2004

(54) ADHESIVE COMPOSITIONS HAVING IMPROVED PERFORMANCE

(75) Inventor: Maged G. Botros, West Chester, OH (US)

(73) Assignee: Equistar Chemicals, E.P., Houston, TX (US)

( * ) Notice: Subject to any disclaimer, the term of this patent is extended or adjusted under 35 U.S.C. 154(b) by 59 days.

(21) Appl. No.: 10/299,282

(22) Filed: Nov. 19, 2002

(65) Prior Publication Data

US 2004/0097637 A1 May 20, 2004

(51) Int. Cl.[7] .................. C08F 120/02; C08F 20/02; C08G 63/91
(52) U.S. Cl. ................. 525/69; 525/71; 525/191; 525/232; 525/240; 525/242; 525/330.2
(58) Field of Search .............. 525/69, 71, 191, 525/232, 240, 242, 330.2

(56) References Cited

U.S. PATENT DOCUMENTS

| 4,087,587 | A | | 5/1978 | Shida et al. |
| 4,298,712 | A | | 11/1981 | Machonis, Jr. et al. |
| 4,487,885 | A | | 12/1984 | Adur et al. |
| 4,774,144 | A | | 9/1988 | Jacheck et al. |
| 5,905,099 | A | | 5/1999 | Everaerts et al. |
| 6,177,516 | B1 | * | 1/2001 | Hudak .......................... 525/71 |
| 6,300,418 | B1 | * | 10/2001 | Brzoskowski et al. ...... 525/191 |
| 6,479,584 | B1 | * | 11/2002 | Nakagawa et al. .......... 525/100 |

FOREIGN PATENT DOCUMENTS

CA    2155160    8/1995

OTHER PUBLICATIONS

Ross, J.F., et al.: "An Improved Gas–Phase Polypropylene Process," *Ind. Eng. Chem. Prod. Res. Dev.*, 24: 149–154 (1985).

* cited by examiner

*Primary Examiner*—Olga Asinovsky
(74) *Attorney, Agent, or Firm*—Gerald A. Baracka; William A. Heidrich

(57) ABSTRACT

Adhesive compositions which exhibit significantly improved adhesion to metals and polyolefins are provided. The compositions are blends of one or more polyolefin base resins and graft-modified polyolefin to which a low level of adhesion promoter is added.

16 Claims, No Drawings

ADHESIVE COMPOSITIONS HAVING IMPROVED PERFORMANCE

BACKGROUND OF THE INVENTION

1. Field of the Invention

The invention generally relates to adhesive compositions and, more specifically, to extrudable adhesive compositions comprised of grafted and ungrafted polyolefin components and an adhesion promoter.

2. Description of the Prior Art

Adhesive blends, commonly referred to as tie layer adhesives, to improve adhesion between polyolefins and dissimilar substrates, such as polyamides and ethylene-vinyl alcohol (EVOH) copolymers, metals and the like, in multi-layer constructions are well known. These adhesive blends typically consist of a base resin, which is the predominant component in the blend, and a modified polymer containing carboxylic or anhydride functionality, e.g., polymers grafted with maleic anhydride. Optionally, one or more other polymeric materials, including rubbers, may be included in the adhesive blends. Representative adhesive blends of the above types are described in U.S. Pat. Nos. 4,087,587; 4,298,712; 4,487,885; 4,774,144; and 5367022.

While numerous tie-layer adhesive compositions have been developed, new formulations which extend the envelope of performance or meet the requirements of new laminate applications are always in demand. Tie-layer adhesives having improved adhesion, particularly at high temperatures, are especially desirable. High temperature conditions may occur as a result of the processing or manufacturing operations or the environment to which the finished article is exposed. Examples of the latter would be for multi-layer tubing for under-the-hood automotive applications where the lines can be exposed to high temperatures for extended periods and where adhesive compositions resistant to thermal degradation are therefore essential. Other applications where heat resistant tie-layer adhesives are necessary are for heat shrinkable multi-layer films used for cook-in applications. Still another application requiring good high temperature performance is for tubing for plumbing applications where the tubing can also undergo repeated heating and cooling cycles and the associated stresses resulting therefrom.

Composite polyolefin/metal pipe and tubing is extensively used for plumbing and heating systems. Polyethylene (PE) and crosslinked PE (PEX) and aluminum are most commonly used for these applications. These constructions typically would have the structure PEX/tie-layer/metal/tie-layer/PEX or PE/tie-layer/metal/tie-layer/PE. Even though the metal provides most of the mechanical strength in these constructions, mechanical integrity and pressure ratings are dependent on the quality of the bond between the metal and PE or PEX. It would be highly desirable if adhesive compositions having improved metal adhesion were available for these applications.

SUMMARY OF THE INVENTION

Adhesive compositions having improved metal adhesion particularly at elevated temperatures are now provided. The compositions consist of blends of a polyolefin base resin and graft modified polyolefin to which a low level of adhesion promoter is added. The incorporation of the adhesion promoter significantly increases adhesion even at temperatures as high as 120° C.

More specifically the improved adhesive compositions of the invention are comprised of (a) an adhesive blend of 75 to 97.5 wt. % polyolefin base resin having a melt index of 0.1 to 100 g/10 min. and 2.5 to 75 wt. % modified polyolefin grafted with 0.5 to 4 wt. % ethylenically unsaturated carboxylic acid or acid derivative; and (b) 50 to 10000 ppm, based on the adhesive blend, of an adhesion promoter selected from the group consisting of organic bases, carboxylic acids and organometallic compounds.

Particularly useful compositions are obtained when the base resin is selected from the group consisting of ethylene homopolymers; copolymers of ethylene with $C_{3-8}$ α-olefins, vinyl carboxylates and alkyl acrylates; terpolymers of ethylene and propylene with diene monomers; polyisobutylene; and copolymers of isobutylene and isoprene; the graft modified polyolefin is polyethylene grafted with maleic anhydride; and the adhesion promoter is a carboxylate of a metal selected from the group consisting of lead, cobalt, iron, nickel, zinc and tin. Dibutyltin dilaurate is an especially useful adhesion promoter.

In another highly useful embodiment, the base resin is a mixture of a highly crystalline polyolefin resin and elastomeric polyolefin resin present at a weight ratio of from 15:1 to 1:1. Base resins comprised of mixtures of polyethylene resins with EPR, EPDM or polyisobutylene provide particularly good adhesion especially when employed with maleic anhydride grafts of HDPE or LLDPE.

DETAILED DESCRIPTION

The present invention provides adhesive compositions useful for a variety of applications but particularly well suited for adhering polyolefins to metal substrates. The adhesive compositions of the invention also provide superior performance in high temperature and barrier applications. One particularly useful application is to adhere polyolefin substrates and metals, such as aluminum and stainless steel. The adhesives are even more advantageously employed for the construction of polyolefin/metal composite pressure pipe for water applications and heating systems which undergo repeated thermal cycles. Composite polyolefin/metal pipes produced using the improved adhesives of the invention exhibit enhanced resistance to delamination at the metal-polyolefin interface.

In general terms, the adhesives of the invention comprise blends of base resin, modified polyolefin and an adhesion promoter. More specifically, the base resin is comprised of one or more polyolefins and the modified polyolefin component is a polyolefin modified by having ethylenically unsaturated carboxylic acid or acid derivative functionality grafted to the polymer backbone. Modified polyolefins of this type are known and, most commonly, are grafted ethylene and propylene homopolymers and copolymers obtained by reacting unsaturated carboxylic acids or anhydrides under grafting conditions. As used herein, the term grafting denotes covalent bonding of a grafting monomer to the polymer chain.

Ethylenically unsaturated carboxylic acids or acid derivatives, such as acid anhydrides, esters, salts or the like which can be grafted include but are not limited to the following: acrylic acid, methacrylic acid, maleic acid, fumaric acid, itaconic acid, citraconic acid, mesaconic acid, maleic anhydride, 4-methyl cyclohex-4-ene-1,2-dicarboxylic acid anhydride, bicyclo(2.2.2)oct-5-ene-2,3-dicarboxylic acid anhydride, 1,2,3,4,5,8,9,10-octahydronaphthalene-2,3-dicarboxylic acid anhydride, bicyclo(2.2.1)hept-5-ene-2,3-dicarboxylic acid anhydride, tetrahydrophthhalic anhydride, norborn-5-ene-2,3-dicarboxylic acid anhydride, Nadic anhydride, methyl Nadic anhydride, Himic anhydride, methyl Himic anhydride, and x-methylbicyclo(2.2.1)hept-5-ene-2,3-dicarboxylic acid anhydride (XMNA). Maleic anhydride (MAH) is a preferred grafting monomer.

Grafted polyolefins useful for the invention may be prepared in solution, in a fluidized bed reactor or by melt grafting. Particularly useful grafted polyolefins for the invention are conveniently prepared by reacting the polyolefin in the substantial absence of a solvent. This can be accomplished in a shear-imparting reactor, such as an extruder/reactor. Twin screw extruder/reactors such as those marketed by Coperion (formerly Werner-Pfleiderer) under the designations ZSK-53 and ZSK-83 are commonly used. A free radical generating catalyst, such as a peroxide catalyst, can be employed but is not necessary.

The grafting reaction is carried at a temperature selected to minimize or avoid rapid vaporization and consequent losses of the graft monomer and any catalyst that may be employed. The graft monomer concentration is typically about 1 to about 5 wt. % based on the total reaction mixture weight. A temperature profile where the temperature of the polyolefin melt increases gradually through the length of the extruder/reactor up to a maximum in the grafting reaction zone, and then decreases toward the reactor exit is preferred. Temperature attenuation is desirable for product pelletizing purposes. The maximum temperature within the reactor should be such that significant vaporization losses and/or premature decomposition of any peroxide catalyst are avoided. For example, with di-t-butyl peroxide and 2,5-dimethyl-2,5-di(t-butylperoxy) hexane, maximum temperatures within the reactor should be maintained at or below about 220° C. Examples of useful peroxide catalysts include: 1,1-bis(tert-butylperoxy)cyclohexane; n-butyl-4,4-bis(tert-butylperoxyvalerate); 1,1-bis(tert-butylperoxy)-3,3,5-trimethylcyclohexane; 2,2-bis(tert-butylperoxy)butane; dicumylperoxide; tert-butylcumylperoxide; α,α'-bis(tert-butylperoxypreoxy-isopropyl)benzene; di-tert-butylperoxide (DTBP); 2,5-dimethyl-2,5-di(tert-butylperoxy) hexane; and the like. Since substantial amounts of solvent are to be avoided, the grafting monomer and any catalyst used are preferably added in neat form to the extruder/reactor.

Polyolefins grafted in accordance with the above procedures can include homopolymers and copolymers of ethylene and propylene or mixtures thereof. Particularly useful are ethylene homopolymers, copolymers of ethylene with $C_{3-8}$ α-olefins, propylene homopolymers and propylene-ethylene copolymers, including random propylene-ethylene copolymers, block copolymers of propylene and ethylene and the so-called impact ethylene-copolymers. The latter resins are intimate mixtures comprised of a continuous crystalline phase (propylene homopolymer) having an amorphous or rubbery phase (ethylene-propylene copolymer) dispersed therein. While impact copolymers can be produced by physically blending the individual polymer components, they are most commonly produced in gas-phase, stirred-bed polymerization processes having two reactors connected in series and using high activity supported transition metal catalysts. Propylene homopolymer is produced in the first reactor and then introduced to the second reactor where additional propylene, ethylene, hydrogen and catalyst, as necessary, are metered to produce the intimate physical mixtures which comprise the propylene-ethylene impact copolymers. Gas phase polymerizations of this type are described in the article by Ross, et al., entitled "An Improved Gas-Phase Polypropylene Process" in *Ind. Eng. Chem. Prod. Res. Dev.* 1985, 24, 149–154, which is incorporated herein by reference.

Graft monomer contents, i.e., the amount of unsaturated acid or derivative reacted, generally range from about 0.5 up to about 4 weight percent (wt. %). Highly useful modified polyolefins for the invention have from 1 to 3 wt. % graft monomer reacted. In a highly useful embodiment of the invention the grafted polyolefin is polyethylene grafted with MAH. High density polyethylene (HDPE) having a density of 0.94 g/cm³ or above and linear low density polyethylene (LLDPE) having a density up to 0.939 g/cm³ grafted with MAH are particularly useful.

The modified polyolefin is combined with a base resin to produce the adhesive blend. The base resin, which is an ungrafted polyolefin and which constitutes the major constituent of the adhesive blend, can comprise a single polyolefin or, as is more commonly the case, a combination of two or more polyolefins can be used.

The polyolefin(s) comprising the base resin can be the same or different than the ethylene or propylene homopolymer or copolymer used for the grafted component and will have a melt index (MI) from 0.1 to 100 g/10 min. determined at 190° C. in accordance with ASTM D-11283, condition E. Highly useful adhesive blends are obtained when the base resin is a mixture of a highly crystalline polyolefin and an elastomeric polyolefin. As used herein, the terms "rubber," "elastomer" or "elastomeric" refers to products having rubber-like properties and little or no crystallinity.

Polyolefins useful for the base resin include ethylene homopolymers; copolymers of ethylene with $C_{3-8}$ α-olefins, vinyl carboxylates and alkyl acrylates; terpolymers of ethylene and propylene with diene monomers; propylene homopolymers; polyisobutylene; and copolymers of isobutylene and isoprene. Ethylene homopolymers and copolymers can include low density polyethylene (LDPE); medium density polyethylene (MDPE); HDPE; LLDPE; so-called very low density polyethylene (VLDPE); so-called ultra low density polyethylene (ULDPE); ethylene-vinyl acetate (EVA) copolymers; ethylene-acrylate copolymers such as ethylene-ethyl acrylate copolymer and ethylene-n-butylacrylate copolymers; and blends thereof.

Useful ethylene copolymer rubbers can include ethylene-vinyl acetate copolymers, ethylene-alkyl acrylate copolymers, and ethylene-α-olefin copolymers. These rubbery copolymers will generally have melt indexes from 0.1 to 100 g/10 min. and, more preferably, from 0.2 to 10 g/10 min. Densities will typically range from 0.850 to 0.980 g/cm². Useful vinyl-acetate copolymers will generally contain from 8% to 60% vinyl acetate and, more preferably, from 10% to 50% vinyl acetate. The ethylene-alkyl acrylate copolymers will generally have from 1% to 50% and, more preferably, from 5% to 50% alkyl acrylate copolymerized. Ethylene-ethyl acrylate and ethylene-n-butyl acrylate copolymers are particularly useful elastomeric polymers of this type.

Ethylene-propylene rubber (EPR) and ethylene-propylene-diene rubber (EPDM) are highly useful elastomeric components for the compositions of the invention. These elastomers typically contain greater than 50 wt. % ethylene and, in one highly useful embodiment of the invention, an EPR or EPDM containing 60% or more ethylene is utilized. Products of this type are obtained by conventional polymerization procedures known to the art and include the so-called metallocene rubbers.

Illustrative elastomers of the above type and which are available from commercial sources include BUNA EPT 2070 (22 Mooney ML(1+4)125° C., 69% ethylene), BUNA EPT 2370 (16 Mooney, 3% ethylene norbornene, 72% ethylene), BUNA 2460 (21 Mooney, 4% ethylene norbornene, 62% ethylene), KELTAN EPDM DE244 (Mooney 55, 71% ethylene, 0.2% ethylene norbornene) and ENGAGE 8100 (23 Mooney (ML(1+4)121° C.) or ENGAGE 8200 with 8 Mooney Still other elastomeric products can be included in the base resin. These include, for example, chlorinated copolymers of isobutylene and isoprene, copolymers of butadiene and styrene, copolymers of isoprene and styrene, block copolymers of butadiene and styrene, block copolymers of isoprene and styrene, block copolymers of isoprene and vinyl toluene, hydrogenated copolymers of butadiene and stryene, hydrogenated block copolymers of isoprene and styrene, copolymers of acrylonitrile and butadiene, copolymers of methacrylonitrile and butadiene, copolymers of acrylonitrile and isoprene, copolymers of methacrylonitrile and isoprene, and the like.

The adhesive blend will contain 75 to 97.5 wt. % and, more preferably, 80 to 95 wt. % base resin. If the base resin is comprised of both crystalline and amorphous polymers, the weight ratio of crystalline to rubbery polymers is from 15:1 to 1:1 and, more preferably, 10:1 to 1.5:1. The graft modified polyolefin constitutes 2.5 to 25 wt. % and, more preferably, 5 to 20 wt. % of the adhesive blend.

In one highly useful embodiment where the base resin comprises both crystalline and elastomeric resin components, the crystalline resin is polyethylene and the elastomeric resin is EPR, EPDM or polyisobutylene. The polyethylene can be HDPE, LDPE, LLDPE, MDPE, VLDPE, ULDPE or mixtures thereof.

To obtain adhesive compositions having significantly improved adhesion, one or more adhesion promoters are added to the adhesive blend, i.e., combined with the base resin and modified polyolefin. Useful promoters include organic bases, carboxylic acids and organometallic compounds including organic titanates and complexes or carboxylates of lead, cobalt, iron, nickel, zinc and tin such as dibutyltin dilaurate, dioctyltin maleate, dibutyltin diacetate, dibutyltin dioctoate, stannous acetate, stannous octoate, lead naphthenate, zinc caprylate, cobalt naphthenate and the like. Tin carboxylates, especially dibutyltin dilaurate (DBTDL) and dioctyltin maleate, are particularly effective promoters for the adhesive blends of the invention.

The adhesion promoter is employed at a concentration of 50 to 10000 parts per million (ppm) of the adhesive blend, i.e., base resin/modified polyolefin mixture. The concentration of adhesion promoter in the adhesive blend is most preferably 100 to 3000 ppm.

The improved adhesive compositions of the invention are prepared by melt mixing the base resin(s), modified polyolefin and adhesion promoter plus any optional components or additives using conventional mixing methods. For example, all of the components can be combined and melt blended in a Banbury mixer or extruder. Adhesive blends produced in this manner can be pelletized and stored for subsequent use. Alternatively, all of the components of the adhesive blend can be dry blended and extruded directly during manufacture of the finished article. Another approach useful in extrusion processes is to combine separate feeds of the adhesive blend and adhesion promoter in the coextrusion operation. In this latter procedure the adhesion promoter will be utilized in masterbatch form, i.e., combined with one or more polyolefins (which may be the same or different than the polyolefins used for the base resin and/or graft component). Masterbatch techniques are also advantageously utilized with other procedures since this facilitates the addition of the low levels of adhesion promoter used and insures uniform distribution of the promoter in the adhesive blend with minimal processing.

For most applications the adhesive blends will also contain one or more stabilizing agents, such as antioxidants, thermal stabilizers, UV inhibitors and the like. The type and amount of these stabilizing agents will depend on the end use application. These additives and others may be added as the components are being melt blended or pre-incorporated with one or more of the components before the final blending operation, for example, in a masterbatch.

The adhesive blends of the invention may be utilized for a variety of bonding applications including bonding plastic, wood, glass, paper, composite and metal substrates. They can be used in lamination, extrusion and coextrusion, sheet extrusion/coextrusion, extrusion/coextrusion lamination, extrusion/coextrusion coating, injection blow molding, melt thermoforming and the like.

In one highly useful application, the adhesive blends are used to bond polyolefins and metals such as aluminum, stainless steel, copper and the like. They are particularly well suited for use as tie layers for polyolefin/metal composite pipes. These are multi-layer constructions, most typically, five-layer composites of polyolefin/adhesive/metal/adhesive/polyolefin. Pipe constructions of this type are used for a wide variety of heating and plumbing applications including, for example, hot and cold potable water installations, radiant floor heating systems, snow and ice melting systems for walks and driveways, compressed air supply lines, radiator connections and industrial and sanitary applications.

For most composite pressure pipe constructions, the metal is aluminum and the polyolefin is polyethylene, and to a lesser extent, polypropylene. A specific five-layer construction of the above type would be polyethylene/adhesive/aluminum/adhesive/polyethylene. While it is not necessary, the polyethylene may be crosslinked, utilizing known technology such as thermal, moisture or irradiated cure processes, to enhance physical properties—particularly high temperature and high pressure resistance. Constructions of this type would be represented PEX/adhesive/aluminum/adhesive/PEX. The PEX can be crosslinked using any of the conventional crosslinking technologies used for this purpose and designated within the industry as PEX-a, PEX-b and PEX-c. Composite pressure pipes of the above types are commercially available, in different sizes and designated for different uses, under the tradenames UNIPIPE, AQUAPEX, ALUPEX, MEPLA, ALPEXTHERM, KITEC and MULTY-GOL.

The following examples illustrate the invention. Those skilled in the art will recognize many variations that are within the spirit of the invention and scope of the claims.

The following adhesive blends were prepared:

Blend A consisted of an adhesive blend containing 86 wt. % base resin and 14 wt. % graft-modified polyolefin to which 600 ppm DBTDL was added. The base resin consisted of a mixture of about 65 wt. % LLDPE (density 0.915 g/cm$^3$; MI 1.0 g/10 min.), about 6 wt. % HDPE (density 0.9540 g/cm$^3$; MI 1.0 g/10 min.), and about 29 wt. % EPR (65 wt. % ethylene; Mooney viscosity ML(1+8) @ 100° C. 30). The graft-modified polyolefin was HDPE grafted with about 2 wt. % MAH.

Blend B consisted of an adhesive blend containing 92 wt. % base resin and 8 wt. % graft-modified polyolefin to which 600 ppm DBTDL was added. The base resin was a mixture of about 79 wt, % HDPE (density 0.9545 g/cm$^3$; MI 18 g/10 min.) and about 21 wt. % polyisobutylene rubber (viscosity average molecular weight 750000–1050000 (Flory); intrinsic viscosity 2.07–2.57 dl/g). The graft-modified polyolefin was the same as used for Blend A.

Blend C consisted of an adhesive blend containing 86 wt. % base resin and 14 wt. % graft-modified polyolefin to which 700 ppm DBTDL was added. The base resin was a mixture containing about 65 wt. % LLDPE (density 0.915 g/cm$^3$; MI 1.0 g/10 min.); about 6 wt. % LDPE (density 0.919 g/cm$^3$; MI 1.0 g/10 min.) and about 29 wt. % EPR (65 wt. % ethylene; Mooney viscosity ML(1+8) @ 100° C. 30). The graft-modified polyolefin was the same as used for Blend A.

Blend D consisted of an adhesive blend containing 92 wt. % base resin and 8 wt. % graft-modified polyolefin to which 700 ppm DBTDL was added. The base resin was a mixture comprising about 74 wt. % HDPE (density 0.9545 g/cm$^3$; MI 18 g/10 min.), about 5.5 wt. % LDPE (density 0.919 g/cm$^3$; MI 1.0 g/10 min.) and about 20.5 wt. % polyisobutylene rubber. The graft-modified polyolefin used was the same as in Blend A and the polyisobutylene the same as used in Blend B.

Each of the above adhesive blends (A–D) also contained 3500–4000 ppm hindered phenol stabilizer. The blends were prepared by melt blending in a twin screw extruder having a temperature profile from 170° C. to 240° C.

To demonstrate the improved adhesion properties obtained with the compositions of the invention, each of the above identified Blends A–D were evaluated for adhesion to aluminum using a simulated ring peel adhesion test. Laminates were prepared by pressing a 12 mil film of the adhesive blend between two sheets of 0.2 mm. aluminum (Reynolds pipe grade 3001 Al) at 420° F. This was accomplished by preheating in a press at 2000–4000 pounds for 5 minutes, increasing the pressure to 40000 pounds for 30 seconds and cooling while maintaining the pressure. One centimeter wide samples were then cut from the laminated sheets, mounted in the ring peel fixture and pulled in an Instron tester at a rate of 10 inches/minute. Test results reported are the average of five pulls.

Comparative adhesive blends were also prepared and tested in accordance with the above described test procedure. The comparative blends were identical to each of the four inventive blends described above (A–D) except that in each case the adhesion promoter was omitted. The respective comparative blends were identified as Comparative Blend A, Comparative Blend B, Comparative Blend C and Comparative Blend D.

To demonstrate the ability of the adhesive blends to provide improved adhesion over a wide temperature range, the samples were tested for adhesion at 23° C. (ambient conditions) and at 120° C. Also, some of the samples were exposed to hot water, i.e., immersed in 95° C. water for from 1 to 4 hours, before adhesion testing. Results obtained for the inventive blends and comparative blends under the various test conditions are set forth in Tables I–IV. The percent increase in adhesion of the inventive blends over the comparative blends is also provided. Adhesion values are in Newtons/centimeter (N/cm).

TABLE I

| Adhesion Test Temperature (° C.) | Blend A Adhesion | Comparative Blend A Adhesion | Adhesion Increase |
|---|---|---|---|
| 23° C. | 115.9 | 91.8 | 26% |
| 23° C.[1] | 100 | 93.5 | 6.9% |
| 23° C.[2] | 142.4 | 94.2 | 51% |
| 120° C. | 8.3 | 5.1 | 63% |
| 120° C.[2] | 39.6 | 13.7 | 189% |

[1]Samples immersed in 95° C. water for 1 hour prior to adhesion testing.
[2]Samples immersed in 95° C. water for 4 hours prior to adhesion testing.

TABLE II

| Adhesion Test Temperature (° C.) | Blend B Adhesion | Comparative Blend B Adhesion | Adhesion Increase |
|---|---|---|---|
| 23° C. | 123.5 | 63.9 | 93% |
| 23° C.[1] | 85.7 | 67.7 | 27% |
| 23° C.[2] | 71.8 | 62.8 | 14% |
| 120° C. | 7.7 | 4.0 | 92% |
| 120° C.[2] | 15.1 | 10.2 | 48% |

[1]Samples immersed in 95° C. water for 1 hour prior to adhesion testing.
[2]Samples immersed in 95° C. water for 4 hours prior to adhesion testing.

TABLE III

| Adhesion Test Temperature (° C.) | Blend C Adhesion | Comparative Blend C Adhesion | Adhesion Increase |
|---|---|---|---|
| 23° C. | 114.9 | 91.8 | 25% |
| 120° C. | 11.1 | 5.1 | 118% |

TABLE IV

| Adhesion Test Temperature (° C.) | Blend D Adhesion | Comparative Blend D Adhesion | Adhesion Increase |
|---|---|---|---|
| 23° C. | 73.5 | 63.9 | 15% |
| 120° C. | 7.3 | 4.0 | 82% |

The marked increase in adhesion obtained with the adhesive blends of the invention over the comparative blends which do not contain the adhesion promoter is apparent from the data. The improvement in adhesion at high temperatures and in the presence of water is particularly significant and noteworthy.

I claim:
1. An adhesive composition comprising:
   (a) an adhesive blend of 80 to 95 wt. % polyolefin base resin having a melt index of 0.1 to 100 g/10 min. and 5 to 20 wt. % modified polyolefin grafted with 0.5 to 4 wt. % ethylenically unsaturated carboxylic acid or acid derivative; and
   (b) 50 to 10000 ppm, based on the adhesive blend, of an adhesion promoter which is a carboxylate of a metal selected from the group consisting of lead, cobalt, iron, nickel, zinc and tin.
2. The composition of claim 1 wherein the modified polyolefin is an ethylene or propylene homopolymer or copolymer grafted with maleic anhydride.
3. The composition of claim 2 wherein the modified polyolefin is polyethylene grafted with maleic anhydride.
4. The composition of claim 3 wherein the modified polyolefin is HDPE having a density greater than 0.94 g/cm$^3$ grafted with 1 to 3 wt. % maleic anhydride.
5. The composition of claim 3 wherein the modified polyolefin is LLDPE having a density up to 0.939 g/cm$^3$ grafted with 1 to 3 wt. % maleic anhydride.

6. The composition of claim 2 wherein the base resin is selected from the group consisting of ethylene homopolymers; copolymers of ethylene with $C_{3-8}$ α-olefins, vinyl carboxylates and alkyl acrylates; terpolymers of ethylene and propylene with diene monomers; polyisobutylene; and copolymers of isobutylene and isoprene.

7. The composition of claim 6 wherein the base resin is a mixture of a highly crystalline polyolefin resin and an elastomeric polyolefin resin present at a weight ratio of from 15:1 to 1:1.

8. The composition of claim 7 wherein the crystalline polyolefin resin is polyethylene resin.

9. The composition of claim 7 wherein the elastomeric polyolefin resin is EPR or EPDM.

10. The composition of claim 7 wherein the elastomeric polyolefin resin is polyisobutylene.

11. The composition of claim 6 wherein the adhesion promoter is a tin carboxylate.

12. The composition of claim 11 wherein the adhesion promoter is dibutyltin dilaurate.

13. The composition of claim 6 wherein the adhesion promoter is present from 100 to 3000 ppm.

14. The composition of claim 13 wherein the base resin is a mixture of polyethylene and an elastomeric resin selected from the group consisting of EPR, EPDM and polyisobutylene and the weight ratio of polyethylene to elastomeric resin is from 10:1 to 1.5:1.

15. The composition of claim 14 wherein the modified polyolefin is polyethylene grafted with 1 to 3 wt. % maleic anhydride.

16. The composition of claim 15 wherein the adhesion promoter is dibutyltin dilaurate.

* * * * *